E. McHUGH.
EYEGLASS CASE.
APPLICATION FILED MAY 9, 1919.
1,333,864.
Patented Mar. 16, 1920.
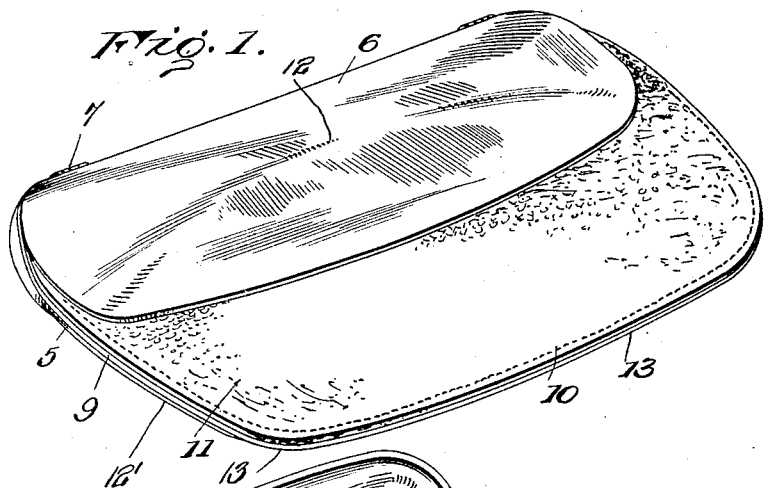
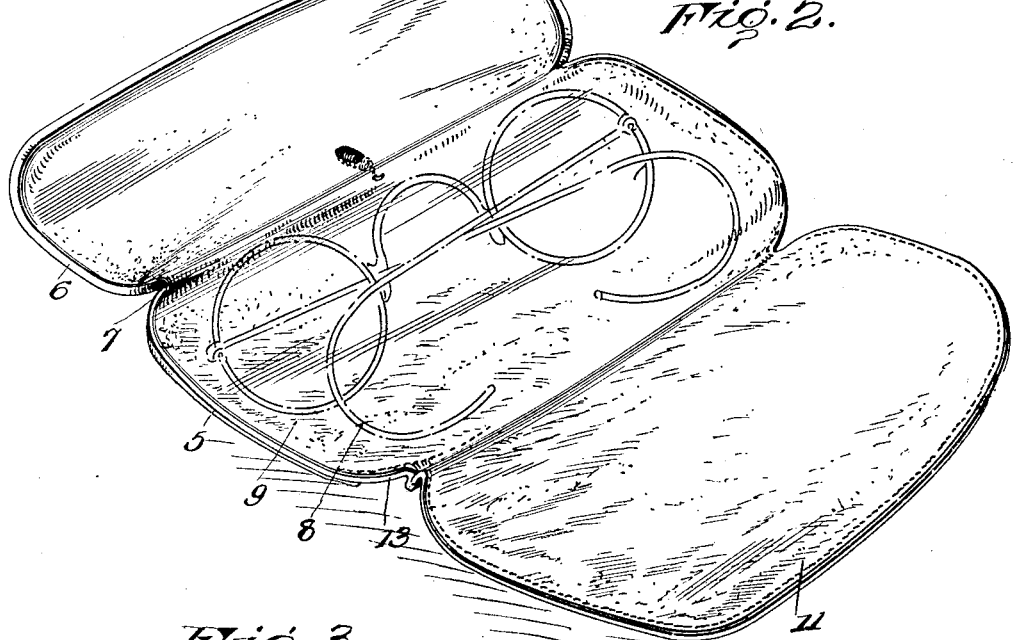
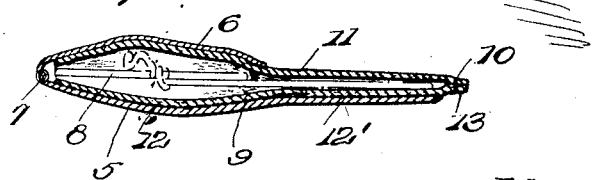
Inventor
Edward McHugh
by Lacey & Lacey,
Attorneys.

UNITED STATES PATENT OFFICE.

EDWARD McHUGH, OF WASHINGTON, DISTRICT OF COLUMBIA.

EYEGLASS-CASE.

1,333,864.  Specification of Letters Patent.  Patented Mar. 16, 1920.

Application filed May 9, 1919.  Serial No. 295,942.

*To all whom it may concern:*

Be it known that I, EDWARD McHUGH, a citizen of the United States, residing at Washington, District of Columbia, have invented certain new and useful Improvements in Eyeglass-Cases, of which the following is a specification.

This invention relates to cases or containers for eye glasses, spectacles and the like, and has for its object to provide a comparatively simple and inexpensive device of this character capable of being conveniently carried in the pocket and which will effectually house and protect a pair of eye glasses against accidential breakage should the case containing said eye glasses be carelessly handled or otherwise subjected to rough usage.

The invention further aims to provide an eye glass case the construction of which is such as to provide ample room for the curved terminals of the side pieces or temples, thereby to prevent fracture of said parts when the case is closed and also to facilitate placing the glasses within or removing them from the case.

The invention further contemplates an eye glass case or holder including pivotally united members to one of which is secured a flexible protecting flap adapted to extend over and cover the eye glasses when the case is closed and form a pad or cushion therefor.

A further object is to construct the flexible flap so that when the case is closed one of the pivoted members thereof will bear against said flap and prevent opening thereof.

A still further object of the invention is generally to improve this class of devices so as to increase their utility, durability and efficiency.

In the drawings:

Figure 1 is a perspective view of an eye glass case or holder embodying the present invention.

Fig. 2 is a similar view showing the case or holder open.

Fig. 3 is a transverse sectional view of Fig. 1.

Corresponding and like parts are referred to in the following description and indicated in all the views of the drawings by the same reference characters.

The eye glass case forming the subject matter of the present invention comprises coacting members 5 and 6, one of which constitutes the body of the case and the other the lid or cover. The members 5 and 6 are pivotally united at 7 so as to permit the cover 6 to be swung rearwardly when it is desired to insert or remove the eye glasses indicated at 8. The member 5 is preferably wider than the cover 6 and secured in any suitable manner to the inner face thereof is a pad or cushion 9 formed of leather, canvas, oil cloth or other impervious material having a felt facing. One edge of the pad 9 is preferably extended laterally beyond the adjacent edge of the body 5 and stitched or otherwise secured thereto at 10 is a protecting flap 11 adapted to extend over and cover the eye glasses 8 as best shown in Fig. 3 of the drawings. The protecting flap 11 is also preferably formed of water proof material having a yieldable facing such as felt which facing bears against the eye glasses and serves to prevent accidental breakage thereof when the case is closed. The intermediate portion of the cover 6 as well as the body 5 is preferably bowed or pressed laterally as indicated at 12 to accommodate the bridge and bow of the eye glasses while the body 5 is extended laterally beyond the intermediate bowed portion 12 thereof to accommodate the curved terminals of the side pieces or temples of said glasses and thus prevent accidental breakage of said temples when the lid or cover 6 is closed.

It will here be noted that the body 5 of the case between the bowed portion 12 and the free edge thereof is straight and substantially flat, as indicated at 12', so as not to offer any obstruction when inserting the case within or removing the case from the pocket of the user. It will also be noted that the pad or cushion 9 preferably extends laterally a slight distance beyond the edge of the straight portion 12' to form a yieldable lip 13 and thus permit the protecting flap 11 to be conveniently moved to open and closed positions.

In operation, the cover 6 is swung laterally on the hinges 7 to open position and the spectacles 8 placed on the pad or cushion 9, after which the protecting flap 11 is swung inwardly and downwardly over the spectacles and the cover 6 swung inwardly in contact with the outer surface of the flap. Attention is here called to the fact that when the cover 6 is closed, the latter by engagement with the outer surface of the protecting flap 11 serves to hold said flap against the glasses and thereby prevent sliding of the glasses within the case and at the same time prevent accidental opening of said flap. In order to remove the glasses it is merely necessary to open the cover 6 and swing the flap 11 laterally to the position shown in Fig. 2 of the drawings when the glasses will be exposed and in which position they may be conveniently removed from the case.

The sections comprising the case may be formed of any suitable material but it is preferred to construct said sections of metal and to cover the exterior of the sections with leather, cloth, or other material, so as to give the case a neat and attractive appearance.

Inasmuch as the corners of the case are all curved or rounded and the extension of the body 5 relatively thin and flat, the case may be conveniently carried in the pocket without damage to the clothing or to the spectacles housed within the case.

The cases may be made in different sizes and shapes and when constructed in the manner set forth will effectually house and protect spectacles and other eye glasses against accidental breakage even though the case containing the glasses be carelessly handled by the owner or otherwise subjected to rough usage.

Having thus described the invention, what is claimed as new is:

1. An eye glass case including relatively stationary and movable substantially concavo-convex members, one of which is provided with an extension, and a flexible protecting flap secured to one of the members near the edge of said extension and movable to operative position between said members to extend over and protect the eye glasses when the case is closed.

2. An eye glass case including pivotally united members of different widths, and a flexible protecting flap secured to the wider member near the free edge thereof and adapted to fit between said members and extend over and protect the eye glasses, said flap being held in contact with the eye glasses by engagement with the other member when the case is closed.

3. An eye glass case including a body portion having a cover pivotally connected therewith and of less width than said body portion, a cushioning member secured to the body and having a portion thereof extending laterally beyond said body, and a flap carried by the extended end of the cushioning member and foldable downwardly over the eye glasses to protect the same, said flap being held in contact with the eye glasses by engagement with the cover when the latter is moved to closed position.

4. An eye glass case including a body having a cover pivotally connected therewith and each provided with an intermediate bowed portion, the body of the case being provided with a flat extension, a pad secured to the body and fitting over said extension, and a protecting flap secured to the pad.

5. An eye glass case including pivotally united sections of different widths one of which constitutes a cover and the other a body portion, a pad secured to the body portion and having one edge thereof extended laterally beyond the free edge of the body portion, and a flexible protecting flap secured to the extended end of the pad and adapted to be folded over the eye glasses, said flap being retained in engagement with the eye glasses by contact with the cover.

6. An eye glass holder including pivotally united members of different widths each having its intermediate portion bowed laterally, the narrow member constituting a cover and the wide member the body of the case, said wide member having that portion thereof between the free edge of the member and the intermediate bowed portion flat, a pad secured to the inner face of the wide member and having one longitudinal edge thereof extended laterally beyond the adjacent edge of the wide member, and a flexible protecting flap secured to the extended end of the pad and foldable downwardly thereon.

In testimony whereof I affix my signature.

EDWARD McHUGH. [L. S.]